UNITED STATES PATENT OFFICE.

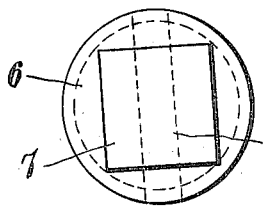

ALBERT H. PUTHOFF AND TIMOLIAN O. NUNNALLY, OF ASHLAND, KENTUCKY, AND JAMES N. RAMSEY, OF CINCINNATI, OHIO.

GREASE-CUP.

1,161,338.  Specification of Letters Patent.  Patented Nov. 23, 1915.

Application filed July 16, 1915. Serial No. 40,233.

*To all whom it may concern:*

Be it known that we, ALBERT H. PUTHOFF and TIMOLIAN O. NUNNALLY, citizens of the United States, residing at Ashland, in the county of Boyd and State of Kentucky, and JAMES N. RAMSEY, a citizen of the United States, residing at Cincinnati, in the county of Hamilton and State of Ohio, have invented certain new and useful Improvements in Grease-Cups, of which the following is a specification.

Our invention relates to lubricating devices, and more especially to those for supplying hard grease to bearings, especially to locomotive crank-pin bearings, where the vibration imposed upon the cup is severe, and which vibration with the ordinary grease cups results in the loss of parts of the cups as well as of the grease contained in the cup.

The object of our invention is to provide an effective locking device to prevent the loss of any part of the cup, but which will at the same time be readily released for manipulating the cup.

Our invention consists in the combination of parts and in the details of construction and arrangement of parts as will herein be more fully described and claimed.

In the drawing: Figure 1 is a vertical sectional elevation of a grease cup embodying our invention; Fig. 2 is a vertical sectional elevation of the same on a line at right angles to that of Fig. 1; Fig. 3 is a detail plan view of the plug; Fig. 4 is a horizontal cross section on a line corresponding to the line $z$—$z$ of Fig. 3; Fig. 5 is a partial vertical sectional detail of a modified plug; Fig. 6 is a detail plan view of the same; and Fig. 7 is a detail of the pin.

The bearing 1, which may be that of a locomotive connecting rod having a journal 2, has an upwardly projecting hub or boss 3 above the journal which has an internally threaded socket 4 extending down near to the journal 2, from the bottom of which socket 3 there leads a reduced passageway 5 into the interior of the journal 2. Screwed down into the socket 4 is a threaded plug 6 which, as shown in Figs. 1, 2 and 3, has at its top a square head 7 to which a wrench may be applied for turning the plug 6.

The construction above described is similar to those heretofore used, the socket 4 containing hard grease, and the plug 6 being screwed down into the socket to force the grease down through the passageway 5 into the journal 2 to lubricate it. When this journal 2 is running at a high speed it becomes very warm and melts the grease in the socket 4, and the plug 6 becoming loose, screws outwardly under the continuous vibration of the bearing in which it is contained and eventually passes entirely out of the socket. When this plug is thrown out of the socket by the rapidly rotating connecting rod of a locomotive, it is not only lost along the roadway, but, at the time it is thrown out, is very dangerous to bystanders. Furthermore, the plug having been lost out of the socket 4, the softened grease will also be thrown out and wasted.

In view of the foregoing it is highly desirable that the plug 6 be retained in the socket under all conditions of operation. We provide for this by forming the plug 6 with a slot 8 diametrically through it and extending longitudinally from a short distance below the square head 7 down to within a short distance of the bottom of the plug, and then provide a suitable pin to engage within this slot and to engage with the hub or boss 3 of the bearing.

As here shown, and as we prefer to provide, a pin 9 passes through an opening 10 in the side of the hub or boss 3 near the top of the socket 4 and through the slot 8 over to the other side of the socket 4. In order that this pin may be held securely in this position and at the same time be very readily removable without the use of any tools and by the use of only one hand, we form it of a single piece of wire, preferably half-round wire such as cotter pins are made of, bent at its middle into a long and narrow V-shape. At a distance from this bend slightly less than the diameter of the inside of the socket 4 the side members of this V-shape are bent abruptly inwardly and then again in the same general direction, so that shoulders 11 are formed; the side members then continuing to form substantially straight parts 12 for a distance considerably exceeding the thickness of the wall of the hub or boss 3 around the socket 4, so that these substantially straight parts 12 form finger-engaging means to manipulate the pin. This formation of the pin is best shown in Fig. 7, where it is shown removed from the other parts. The pin thus formed has its bent end inserted first through the opening 10, and upon pushing the pin into this opening, the members of the pin are drawn together until the substantially straight terminal parts 12 come very close together, the diameter of the opening 10 being sufficient to allow the passage of the widest part of the pin at the shoulders 11 when these parts 12 thus come close together. The pin is pushed inward until these shoulders 11 pass the interior wall of the socket at the inner end of the opening 10, whereupon the resiliency of the material of the pin causes its members to spring apart, and the shoulders 11 engage with the wall at the sides of the opening 10, the slot 8 in the plug being wide enough to allow these members to thus spring apart. In removing the pin it is necessary only to grasp the parts 12 with the thumb and finger, pull them together and thus disengage the shoulders 11 from the interior wall of the socket 4, and then pull the pin out. This will permit the plug to be turned, to screw it down into the socket 4 and force more grease into the bearing or journal 2, whereupon the pin may again be inserted. It will be seen that the pin thus provided may be made to hold the plug at each half revolution of the plug, which will afford an amply fine adjustment for the plug in the socket.

As above described, the slot 8 is made wide enough to allow the pin to be inserted with its shoulders substantially in a horizontal plane. However, if the pin is inserted in any other position, as with the shoulders in vertical alinement, it will be held against dislodgment. Were the slot 8 made only wide enough to admit the pin in this position, the device would be practical, but would not be so desirable in that, should a careless person insert the pin with the shoulders 11 in a substantially horizontal plane, the members of the pin would be held together by the walls of the narrow slot without allowing the shoulders to engage with the interior wall of the socket 4 at the sides of the opening 10; and thus the pin would be allowed to work loose under vibration of the bearing. Therefore, the specific construction shown is more proof against carelessness on the part of the operator, but it will be understood that our claims are not necessarily limited to this specific example.

In the modification shown in Fig. 5, instead of the plug 6 with the square head 7, there is shown the plug 6' with an angular socket 7', which may admit a socket wrench for turning the plug. The plug is provided with a longitudinal slot 8' like the slot 8 in the preceding example.

As shown herein the socket 4 is contained directly in the boss of the connecting rod 1. However, as is well known in the art, it will be understood that a separate bushing or cup may be provided for screwing into a suitable socket in the bearing or connecting rod, and the plug may be screwed into this bushing or cup, which will have the lateral opening 10 for the pin 9.

Modifications of our invention may be made without departing from its spirit or scope, and we do not wish to be confined to the exact details shown.

Having fully described our invention, what we claim as new and desire to secure by Letters Patent is:

1. In combination with a bearing, a member thereon having an internally threaded socket, an externally threaded plug screwed into said socket, and having a slot transversely through it and extending longitudinally thereof, and said member on said bearing having an opening from its outer side into said socket near the top of the socket, a pin extending through said opening and into said slot to prevent said plug from turning in said socket, said pin comprising means for removably securing it in said opening and said slot.

2. In combination with a bearing, a member thereon having an internally threaded socket, an externally threaded plug screwed into said socket, and having a slot transversely through it and extending longitudinally thereof, and said member on said bearing having an opening from its outer side into said socket near the top of the socket, a pin extending through said opening and into said slot to prevent said plug from turning in said socket, said pin being composed of a single piece of resilient material bent at its middle into elongated V formation, and the side members of said V formation being bent inwardly and then again in the same general direction at a distance from the middle bend of the piece slightly less than the internal diameter of said socket, whereby shoulders are formed opposite to each other, and said side members then continuing substantially straight from said shoulders for a distance somewhat greater than the thickness of said means around said socket where the opening is therethrough, so that, when said pin is inserted through said opening and into said slot, said shoulders, due to outward springing of the members of said resilient piece, come against the interior wall of said socket at opposite sides of said opening to hold the pin in said opening and slot, and said substantially straight part extends out past the exterior of said member on said bearing to form grasping means for drawing the members of said pin together and disengaging said shoulders to withdraw the pin from said slot and opening.

3. In combination with a bearing, a member thereon having an internally threaded socket, an externally threaded plug screwed into said socket, and having a slot transversely through it and extending longitudinally thereof, and said member on said bearing having an opening from its outer side into said socket near the top of the socket, a pin extending through said opening and into said slot to prevent said plug from turning in said socket, said pin being composed of a single piece of resilient material bent at its middle into elongated V formation, and the side members of said V formation being bent inwardly and then again in the same general direction at a distance from the middle bend of the piece slightly less than the internal diameter of said socket, whereby shoulders are formed opposite to each other, and said side members then continuing substantially straight from said shoulders for a distance somewhat greater than the thickness of said member around said socket where the opening is therethrough, so that, when said pin is inserted through said opening and into said slot, said shoulders, due to outward springing of the members of said resilient piece, come against the interior wall of said socket at opposite sides of said opening to hold the pin in said opening and slot, and said substantially straight part extends out past the exterior of said member on said bearing to form grasping means for drawing the members of said pin together and disengaging said shoulders to withdraw the pin from said slot and opening, said slot being wider than said opening, whereby said members of said pin may spread apart transversely of the slot and have its shoulders engaged with said interior of said socket as aforesaid.

4. In combination with a bearing, a member thereon having a threaded socket provided with an opening into said socket near the top thereof, a plug in said socket adapted to be moved longitudinally therein and be held in varying positions lengthwise of said socket, said plug having a slot transversely therethrough and extending longitudinally thereof, and a spring pin adapted to be inserted in said opening and slot, and having a shoulder adapted to engage the wall of said socket and prevent accidental removal of the pin from the opening and slot.

5. In a grease cup device for a bearing, a socket mounted over said bearing and communicating therewith, said socket having a lateral opening outwardly therefrom near its top, a plug having a longitudinal slot extending transversely therethrough, means for maintaining said plug in adjusted positions in said socket, and a pin having laterally yielding means provided with a shoulder adapted to engage the inner wall of said socket to hold said pin therein, and having projecting handles whereby said arms may be compressed toward each other and the pin withdrawn and inserted thereby when desired.

6. In combination with a bearing, a member thereon having an internally threaded socket, an externally threaded plug screwed into said socket and having a slot transversely therein and extending longitudinally thereof, and said member on said bearing having an opening from its outer side into said socket, and a key provided with a shoulder and having a spring member to removably secure said key in said opening and said slot.

7. In a grease cup device, a member having a socket adapted to communicate with a bearing, said member having a lateral opening leading from said socket, a plug having a longitudinal slot extending transversely therethrough, and a spring key having wings, one of which is provided with a shoulder whereby said key is removably secured in said opening and said slot.

ALBERT H. PUTHOFF.
TIMOLIAN O. NUNNALLY.

Witnesses:
 J. H. SHANKLIN,
 C. F. SCHORMAN.

JAMES N. RAMSEY.

Witnesses:
 CATHERINE DORAN,
 IRENE PARKER.

Copies of this patent may be obtained for five cents each, by addressing the "Commissioner of Patents, Washington, D. C."